W. VAN DEN BROECK.
CINEMATOGRAPH AND SAFETY DEVICE THEREFOR.
APPLICATION FILED MAR. 17, 1920.
1,380,756.
Patented June 7, 1921.
2 SHEETS—SHEET 1.
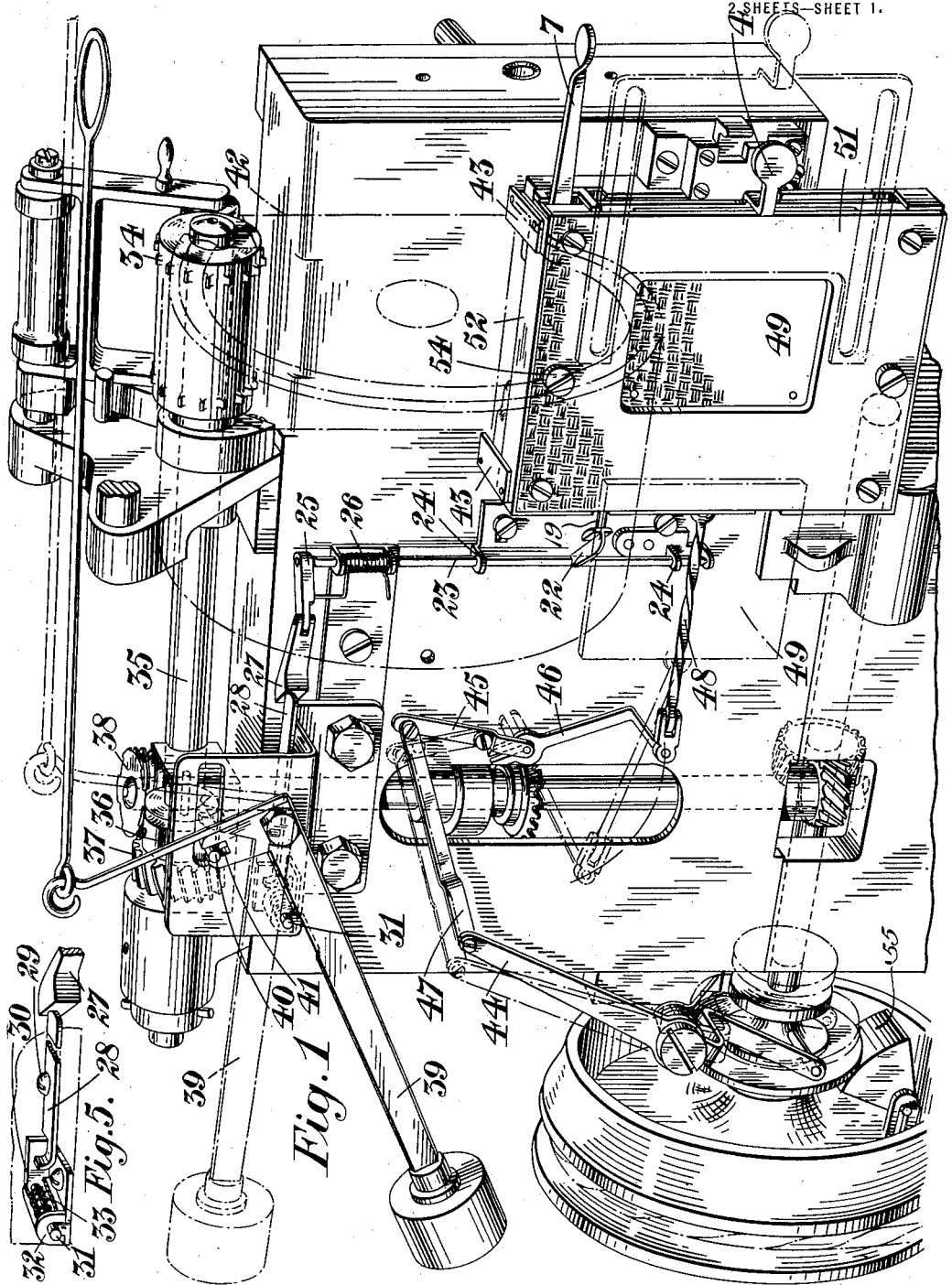
Inventor
William Van den Broeck W. VAN DEN BROECK.
CINEMATOGRAPH AND SAFETY DEVICE THEREFOR.
APPLICATION FILED MAR. 17, 1920.
1,380,756.
Patented June 7, 1921.
2 SHEETS—SHEET 2.
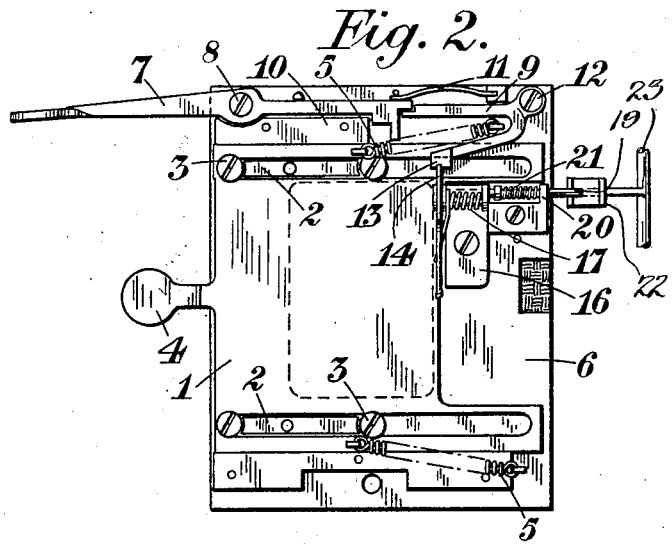
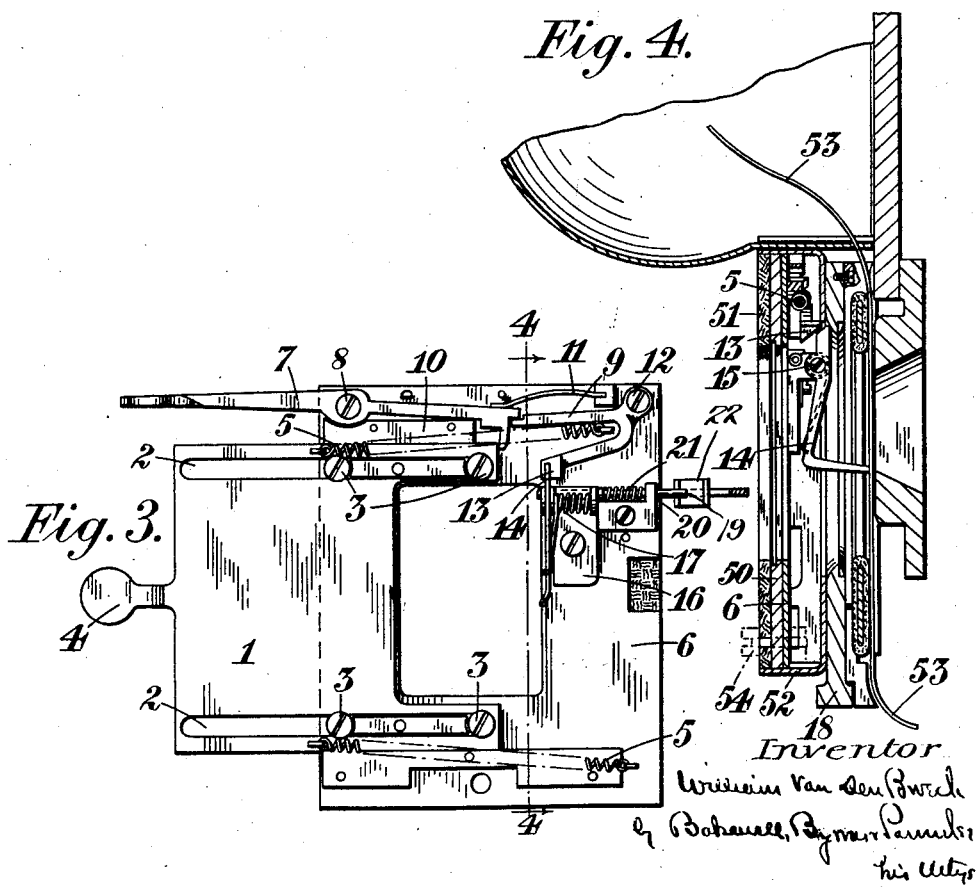

UNITED STATES PATENT OFFICE.

WILLIAM VAN DEN BROECK, OF LONDON, ENGLAND.

CINEMATOGRAPH AND SAFETY DEVICE THEREFOR.

1,380,756.  Specification of Letters Patent.  Patented June 7, 1921.

Application filed March 17, 1920. Serial No. 366,636.

*To all whom it may concern:*

Be it known that I, WILLIAM VAN DEN BROECK, a subject of the King of the Belgians, residing at London, England, have invented certain new and useful Improvements in Cinematographs and Safety Devices Therefor, of which the following is a specification.

This invention consists in improvements in or relating to cinematographs and safety devices therefor, the object being to prevent fire and avoid destruction of films.

Specific objects are to provide means for shutting off the film from the lantern immediately a break occurs in the film passing the gate; means for stopping the film feed immediately such a break occurs; means for protecting from fire the film approaching the gate; and means for shutting off the film from the lantern when the speed of the driving mechanism falls below a predetermined minimum.

A cinematograph according to this invention, comprises, a spring closed sliding door incorporated in a frame attached to the gate between the source of light and the film; a detent to hold the door open while the film is intact; a system of spring actuated levers or the like, dependent for their position upon the continuity of the film in the gate and arranged so as to release the detent when the film breaks.

A further feature of the invention lies in the employment of the action of the closing door, as a means for automatically cutting out the drive for the film feed. This is accomplished by a system of levers, hereinafter described, actuated by the closing door, and so arranged as to withdraw a pin supporting a gravity-arm lever. This gravity-arm is so designed that on falling it separates the two worm wheels which constitute the drive of the film feed.

A further feature of this invention is the provision of a box disposed on the feed side (say top) of the gate and so arranged that when a break of the film occurs in the gate, the portion of film approaching the gate is coiled into the box and is thereby prevented from coming in contact with the lantern.

A further feature of the invention lies in the employment of a second sliding door, in the frame attached to the gate, operatively connected with a governor or equivalent in the driving mechanism, so that the said door is automatically closed when the speed of the feed mechanism falls below a determined figure, and is automatically opened when the normal speed is again established.

For a more complete understanding of the invention there will now be described a cinematograph projector incorporating types of construction for the improvements enumerated above.

It is to be understood that this description is given by the way of example only and the constructional details enumerated may be modified in many respects without departing from the spirit and scope of the invention.

In the accompanying drawing:—

Figure 1 is a perspective view of the lantern side of the projector.

Fig. 2 is an elevation of the spring closed door and the plate on which it slides, showing the position of the door and controlling mechanism when the door is closed.

Fig. 3 the same as Fig. 2, showing the position of the door and controlling mechanism when the door is open.

Fig. 4 is a section through the frame and gate.

Fig. 5 is a perspective detail of a form of construction suitable for withdrawing the support of the gravity arm.

Like letters of reference indicate like parts throughout the drawings.

The construction of the spring-closed door and the mechanism for operating the same will first be described.

The door 1 comprising a sheet of material in which two slots 2 are cut, one being located along the top and the other along the bottom, slides upon four pins 3 or the like located in said slots and fixed in a plate 6 which is incorporated in a detachable frame 52. This frame is attached to the back (lantern side) of the gate 18. A convenient projection 4 is formed on one extremity of the door so that it may be slid open by hand when required. The door is opened against the action of two springs 5. The door, when open is kept in position by a detent lever 7, which is pivoted on a pin 8 or the like fixed in the plate 6. One end of this lever is formed so that it may be pressed down by hand and the other end is formed to hook over the corner of the door and also to rest on the extremity of a further lever 9. The detent lever is kept in position when the door is open by being pressed by the action of a spring 11 against a stop 10 fixed to the framework. The lever 9 is approximately U-shaped and is pivoted at the bottom of the U upon a pin 12 or the like fixed to the plate 6. One extremity of this lever bears against the detent lever as described and the other has formed upon it a wedge shaped projection 13. Bearing upon this projection is the extremity of a further lever 14, the plane of rotation of which is at right angles to that of the aforesaid levers and parallel to the direction of motion of the film 53. This lever is pivoted on a pin 15 or the like which is fixed to an angle member 16 attached to the plate 6. One end of this lever bears on the wedge portion 13 as described. The other end is bent inward toward the gate and rests upon the edge of the film 53 and is kept pressed up against it by means of the spring 17. The working of this mechanism is then as follows. After having threaded up the film in the usual manner, the door 1 is slid open by hand against the action of the spring 5, until the detent lever 7 springs into place. The detent lever is not disturbed by levers 9 and 14 since the motion of the latter is restrained by the film. Having started the cinematograph should a break occur in the film while it is passing the gate, the end of lever 14 which is normally pressed against the film will immediately move forward, the other end will press against the wedge portion of lever 9 causing the whole to rotate and thereby to lift the detent which in its turn releases the door. The door will then be closed under the action of springs 5.

The mechanism by means of which the spring closed door causes the film feed to be stopped will next be described.

A horizontal pin 19 is mounted in guides 20 which are fixed to the plate 6. The whole is so situated that the door upon closing bears against one end of the said pin causing it to slide in its bearings against the action of a spring 21. The other extremity of the pin bears against a radial abutment 22 mounted on a vertical rotatable spring controlled spindle 23. This spindle is supported in bearings 24 which are fixed to the standard of the machine. Mounted on the upper end of this spindle is a toggle lever 25 against which rests the spindle control spring 26. Pivoted to the end of the toggle lever is a pawl 27. The rotation of the spindle causes an endwise motion to the pawl, since it is prevented rotating with the toggle lever by bearing against a part of the main frame. The end face of the pawl is formed at an angle to the direction of endwise motion.

A lever 28, with a vertical pivot 29 parallel to spindle 23, is arranged so that one extremity bears upon the end face of said pawl, and the other extremity engages with a lug 30 fixed to a pin 31. This pin is mounted in a guide 32 and controlled by a spring 33. The axis of said pin is parallel to the plane of rotation of the lever 28 and at right angles to the main frame-work of the machine. It will be understood therefore that the action of the sliding pawl is to rotate the lever 28 which causes the pin 31 to move inward against the action of its spring toward the main frame. Turning now to the film feed, the sprocket wheel 34 is mounted above the gate in the standard of the machine, on the rotatable shaft 35. Mounted on this shaft is a sliding sleeve 36 which may be keyed or otherwise non-rotatably engaged with the shaft. This sleeve carries a worm wheel 37 and in one position of the sleeve (the operative position) the worm wheel is engaged by a worm 38, but in another position of the sleeve the worm wheel is out of engagement with the worm, so that the sprocket wheel is not then driven. The sliding sleeve is preferably actuated by a gravity bell crank lever 39 pivotally mounted in the standard. The connection between the sleeve and said lever is formed by a pin 40 fixed to the sleeve and arranged to engage with a slot 41 cut in the end of the lever. When the worm wheel is in the operative position, the bell crank lever is supported by the pin 31 already described.

The complete action then of the mechanism is as follows:

The door 1 upon closing, forces the pin 19 against the radial abutment 22 causing the spindle 23 and toggle lever 25 to rotate. The rotation of the toggle lever produces endwise motion in the pawl 27, the end face of which pressing against the lever 28 causes the latter to rotate and thereby to withdraw the pin 31. The effect of the withdrawal of said pin is to allow the gravity bell-crank lever to drop, which in so doing causes, through an operative connection 40, 41, the sleeve 36 bearing the worm wheel 37 to be parted from the worm 38. In this manner the film feed mechanism is cut out.

The apparatus used for the collection and protection from fire of the film approaching the gate, is next described.

The apparatus consists of a box 42 such as shown dotted in Fig. 1 which is attached between the feed sprocket wheel 34 and the film side of the gate. This box serves two purposes, firstly to collect any film fed in by the sprocket after the film has broken, secondly in normal circumstances to protect from fire the film passing from the sprocket to the gate or in the case where a break has occurred to protect the film fed into the box. The box is clamped to the gate by suitable clamps 43. The mechanism next described, is a means for closing a second sliding door in the frame, when a predetermined minimum speed is reached and for opening the same when the normal speed is again established. A governor 55, such as shown in Fig. 1, is incorporated in one of the rotating parts of the machines and is connected through levers 44, 45 and 46 and links 47 and 48 to the sliding door 49. The said door is preferably made from asbestos. The slide for this door is formed in the plate 50 which is attached to plate 6. To the lantern side of plate 50 is attached an asbestos sheet 51.

It will be appreciated that the framework carrying the sliding doors forms a readily attachable unit which can be affixed without difficulty to existing cinematographs by means of two or more screws 54.

In a cinematograph the film, should it rupture, ceases to be drawn through by the feed mechanism below the gate but continues to be fed by the mechanism above the gate. This is a frequent cause of fires inasmuch as the film passing the gate, although it is provided with pads above and below which prevent the spread of fire along the film, causes a puff of flame backward toward the condenser. The film, approaching the gate from above, very rapidly forms a slack loop which hangs down between the condenser and the gate and meets the puff of flame and becomes ignited. The sliding-door mechanism above described, by closing the instant that the film is ruptured either by ignition or otherwise, prevents the puff of flame from coming out, and thus acts of itself to prevent fires. As an additional safeguard, however, there is preferably provided, above the gate frame, an approximately semicircular box through which the film, in being fed downward, passes. On rupture the film, instead of forming a slack loop hanging down between the condenser and the gate, collects into the box, and the operator has time to stop the machine without a fire commencing. As the machine slows down the asbestos covered sliding-door moves over and cuts off the heat from the gate frame.

The expression "gate frame" employed in the following claims is intended to cover that portion of a cinematograph projector which surrounds and supports the film in the immediate neighborhood of the projection opening.

What I claim as my invention and desire to secure by Letters Patent is:—

1. In a safety device for a cinematograph having a light source, the combination of a gate frame, a film therein, a sliding door in the said frame between the light source and the film, self acting means within said frame for closing the door when free, means within said frame in contact with and operated by said film when intact to hold the door open, and means within said frame for releasing the door when said film breaks.

2. In a safety device for a cinematograph having a light source, the combination of a gate frame, a film therein, a sliding door in said frame between the light source and the film, self-acting means within said frame for closing the door when free, a detent mounted in said frame controlled through contact with said film when intact and arranged to engage and hold the door open, and means within said frame for releasing said detent when the film breaks.

3. In a safety device for a cinematograph having a light source, the combination of a gate frame, a film therein, a spring-closed sliding door in said frame between the light source and the film, a detent mounted in said frame and controlled through contact with said film while intact holding said door open, and means within said frame for releasing said detent when the film breaks.

4. In a safety device for a cinematograph having a light source, the combination of a gate frame, a film therein, a spring-closed sliding door in said frame between the light source and the film, a spring-controlled detent mounted in said frame arranged to engage and hold the doop open, a spring-controlled bell-crank lever mounted in said frame engaging with the film at the gate frame while intact, an operative connection at one end between said bell-crank lever and the said detent to release the detent when the film breaks.

5. In a safety device for a cinematograph, the combination of a gate frame, a film therein, a sliding door in the said frame, self-acting means for closing the door when free, means operated by said film when intact to hold the door open, and means for releasing the door when said film breaks, mechanism for feeding the film to said gate frame, separable driving gear elements in said mechanism and means actuated by the closing of said sliding door for separating said elements when the film breaks.

6. In a safety device for a cinematograph, the combination of a gate frame, a film therein, a sliding door in the said frame, self-acting means for closing the door when free, means operated by said film when intact to hold the door open, and means for releasing the door when said film breaks, mechanism for feeding the film to said gate frame, separable driving gear elements in said mechanism and means actuated by the closing of said sliding door for separating said elements when the film breaks, and means for collecting and guarding from fire the film approaching said gate.

7. In a safety device for a cinematograph, the combination of a gate frame, a film therein, a sliding door in the said frame, self-acting means for closing the door when free, means operated by said film when intact to hold the door open, means for releasing the door when said film breaks, mechanism for feeding the film to said gate frame, separable driving gear-elements in said mechanism, means actuated by the closing of said sliding door for separating said elements when the film breaks, means for collecting and guarding from fire the film approaching said gate, a second sliding door in said frame, a governor in the driving mechanism, and means controlled by said governor for opening and closing said door at predetermined speeds of film feed.

8. In a safety device for a cinematograph having a source of light, the combination of a gate frame, a film therein, a spring controlled door sliding within said frame between the light source and the said film, said door tending to close, a detent mounted in said frame to hold said door open against said springs, a trip mounted in said frame and normally in contact with the film and actuated by the breaking of said film to release said detent.

9. In a safety device for a cinematograph having a source of light, the combination of a gate frame, a film therein, a spring controlled door sliding within said frame between the light source and the film, said door tending to close, a detent mounted in said frame to normally hold said door open against said springs, a pivoted lever mounted in said frame and bearing against said detent, a spring controlled pivoted bell-crank lever in said frame, bearing at one end against said first lever and at the other end against said film and so arranged that its motion caused by the film breaking releases said detent.

10. In a safety device for a cinematograph, the combination of a gate frame, a film therein, a spring controlled sliding door tending to close, a detent to hold said door open against said springs, a pivoted lever bearing against said detent, a spring controlled pivoted bell-crank lever, bearing as to one end against said first lever and as to the other end against said film and arranged so that its motion caused by the film breaking releases said detent, a film feed sprocket wheel, a shaft for same, a keyed sliding pinion mounted on said shaft, a driving pinion with which said sliding pinion in one position engages, a pivoted gravity bell-crank lever operatively connected to said sliding pinion, a withdrawable support for said bell-crank lever, a linkwork set in motion by the closing of said door and operatively connected to withdraw said support.

11. In a safety device for a cinematograph, the combination of a gate frame, a film therein, a spring controlled sliding door tending to close, a detent to hold said door open against said springs, a pivoted lever bearing against said detent, a spring controlled pivoted bell-crank lever, bearing as to one end against said first lever and as to the other end against said film and arranged so that its motion caused by the film breaking releases said detent, a film feed sprocket wheel, a shaft for same, a keyed sliding pinion mounted on said shaft, a driving pinion with which said sliding pinion in one position engages, a pivoted gravity bell-crank lever operatively connected to said sliding pinion, a withdrawable support for said bell-crank lever, a linkwork set in motion by the closing of said door and operatively connected to withdraw said support, a box disposed between said film feed sprocket wheel and said gate frame, to collect and guard from fire said film approaching said gate frame.

12. In a safety device for a cinematograph, the combination of a gate frame, a film therein, a spring controlled sliding door tending to close, a detent to hold said door open against said springs, a pivoted lever bearing against said detent, a spring controlled pivoted bell-crank lever bearing as to one end against said first lever and as to the other end against said film and arranged so that its motion caused by the film breaking releases said detent, a film feed sprocket wheel, a shaft for same, a keyed sliding pinion mounted on said shaft, a driving pinion with which said sliding pinion in one position engages, a pivoted gravity bell-crank-lever operatively connected to said sliding pinion, a withdrawable support for said bell-crank lever, a linkwork set in motion by the closing of said door and operatively connected to withdraw said support, a box disposed between said film feed sprocket wheel and said gate frame, to collect and guard from fire said film approaching said gate frame, a governor in the driving mechanism, a second sliding door in said frame, a linkwork connecting said governor and said sliding door, so as to close and open it at predetermined speeds.

In testimony whereof I affix my signature.

W. VAN DEN BROECK.